United States Patent
Kim et al.

(10) Patent No.: US 8,774,584 B2
(45) Date of Patent: Jul. 8, 2014

(54) FIBER DISTRIBUTION HOUSING

(75) Inventors: Sang Yub Kim, Suwon-si (KR); Hyup Jae Chung, Seoul (KR); Myung Ryun Yoon, Nonsan-si (KR); Tae Seon Moon, Nonsan-si (KR)

(73) Assignee: LS Cable & System Ltd., Anyang-si, Gyeonggi-do (KR)

( * ) Notice: Subject to any disclaimer, the term of this patent is extended or adjusted under 35 U.S.C. 154(b) by 206 days.

(21) Appl. No.: 13/432,419

(22) Filed: Mar. 28, 2012

(65) Prior Publication Data

US 2013/0039628 A1    Feb. 14, 2013

(30) Foreign Application Priority Data

Aug. 11, 2011  (KR) .................. 10-2011-0079935

(51) Int. Cl.
*G02B 6/00*    (2006.01)

(52) U.S. Cl.
USPC ........ 385/135; 312/223.6; 312/287; 312/323; 361/724; 52/57

(58) Field of Classification Search
CPC .............................. G02B 6/4452; G02B 6/4459
USPC ........ 385/135; 312/223.6, 287, 323; 361/724; 52/57
See application file for complete search history.

(56) References Cited

U.S. PATENT DOCUMENTS

| | | | | | |
|---|---|---|---|---|---|
| 4,765,710 | A | * | 8/1988 | Burmeister et al. | 385/134 |
| 4,864,888 | A | * | 9/1989 | Iwata | 74/640 |
| 5,274,731 | A | * | 12/1993 | White | 385/135 |
| 5,434,944 | A | * | 7/1995 | Kerry et al. | 385/135 |
| 5,778,131 | A | * | 7/1998 | Llewellyn et al. | 385/135 |
| 6,995,813 | B2 | * | 2/2006 | Shin | 349/58 |
| 7,773,850 | B2 | * | 8/2010 | Caveney | 385/135 |
| 7,952,023 | B2 | * | 5/2011 | Caveney et al. | 174/68.1 |
| 2002/0092245 | A1 | * | 7/2002 | Floyd et al. | 52/36.2 |
| 2003/0118311 | A1 | * | 6/2003 | Thibault et al. | 385/134 |
| 2006/0128479 | A1 | * | 6/2006 | Kapustin et al. | 464/119 |
| 2008/0079341 | A1 | * | 4/2008 | Anderson et al. | 312/287 |
| 2009/0110359 | A1 | * | 4/2009 | Smith et al. | 385/135 |
| 2009/0245743 | A1 | * | 10/2009 | Cote et al. | 385/135 |
| 2009/0305538 | A1 | * | 12/2009 | Caveney et al. | 439/207 |
| 2010/0027952 | A1 | * | 2/2010 | Ruiz et al. | 385/135 |
| 2010/0316334 | A1 | * | 12/2010 | Kewitsch | 385/78 |

* cited by examiner

*Primary Examiner* — Peter Radkowski
(74) *Attorney, Agent, or Firm* — Sherr & Jiang, PLLC

(57) ABSTRACT

Disclosed herein is a fiber distribution housing which maximizes worker's operation efficiency, simplifies arrangement of optical cables within the fiber distribution housing, and minimizes tension or stress applied to the optical cables.

16 Claims, 7 Drawing Sheets

FIBER DISTRIBUTION HOUSING

CROSS REFERENCE TO PRIOR APPLICATIONS

The present application claims priority under 35 U.S.C. §119 to Korean Patent Application No. 10-2011-0079935 (filed on Aug. 11, 2011), which is hereby incorporated by reference in its entirety.

BACKGROUND OF THE INVENTION

1. Field of the Invention

The present invention relates to a fiber distribution housing of a home terminal box for fiber to the home (FTTH) and high-speed optical information communication, and more particularly to a fiber distribution housing which maximizes worker's operation efficiency, simplifies arrangement of optical cables within the fiber distribution housing, and minimizes tension or stress applied to the optical cables.

2. Description of the Related Art

In general, fiber distribution housings are installed on subscriber lines, central offices, relay stations, etc., and serve to distribute optical cables to be connected with plural systems or demand households.

Such a fiber distribution housing may include optical terminals corresponding to the number of households or office spaces requiring optical communication. Therefore, when optical cables supplied by a supplier are embedded into respective buildings or distributed to respective demand places, the fiber distribution housing needs to have essential and effective distribution capacity.

The effective distribution capacity of the fiber distribution housing is closely related to efficiency in a cable connecting operation of the fiber distribution housing by a worker.

In most of the conventional fiber distribution housings, some surfaces are opened, and a connecting panel to which a housing having an inner space, optical cables entering from the outside and optical cables split towards the outside are respectively connected are fixed to the insides of the fiber distribution housings.

Therefore, if a worker performs a cable connecting operation, in order to perform an operation of respectively connecting cables to cable connection adapters provided on the front surface and the rear surface of the connecting panel, the connecting panel or a portion of the housing is separated from the fiber distribution housing so that the worker can reach the connecting panel, or if the connecting panel is not separated from the fiber distribution housing, the worker can reach the inner space of the fiber distribution housing under the condition that a portion of the housing is opened and thus the operation is convenient to perform.

Further, even if the connecting panel is installed in the inner space of the fiber distribution housing, in which various electric parts are mounted, so as to be rotatable about a hinge, optical cables around the connecting panel may interfere with the connecting panel, or arrangement of the cables may be complicated.

Moreover, if the connecting panel is configured to be rotatable, optical cables entering from the outside or split optical cables may interfere with the connecting panel, the cables may be damaged by such interference or communication errors may be generated due to tension or stress, and efficiency of the cable connecting operation by the worker on the connecting panel may be lowered.

SUMMARY OF THE INVENTION

Therefore, the present invention has been made in view of the above problems, and it is an object of the present invention to provide a fiber distribution housing which maximizes worker's operation efficiency, simplifies arrangement of optical cables within the fiber distribution housing, and minimizes tension or stress applied to the optical cables.

In accordance with an aspect of the present invention, the above and other objects can be accomplished by the provision of a fiber distribution housing including a housing having an accommodation space, a splitting part for splitting feeding cables entering the housing, a connecting part having a plurality of connection adapters formed on the front and rear surfaces thereof, and mounted on the housing to be displaced to a first position and a second position, and a coupling part for mounting the connecting part on the housing and for enabling the split cables split by the splitting part to pass through the coupling part and be connected to the plurality of connection adapters of the connecting part.

The splitting part may be mounted on one of the inner wall surfaces of the housing, and the coupling part may be provided below the splitting part.

The coupling part may include a fixing member fastened to the one of the inner wall surfaces of the housing, a hollow connection member passing through the fixing member, and a bearing member supporting the outer circumferential surface of the hollow connection member.

The split cables may pass through the hollow connection member.

The coupling part may further include a bracket member which is mounted on the connecting part and on which the bearing member is seated.

The fixing member may be horizontally mounted on an inner side wall surface from among the inner wall surfaces of the housing.

The connecting part may include a connecting panel having the plurality of connection adapters on the front and rear surface thereof, and a connecting cabinet which has opened front and rear surfaces and on which the connecting panel is mounted, and the connecting cabinet may be coupled with the housing by the coupling part.

A separation distance between the connecting part at the first position, where the connecting part is accommodated in the housing, and the rear surface of the housing may be 30 mm to 100 mm.

A plurality of spools on which the split cables are wound may be provided on the inner side wall surface of the connecting cabinet, and be arranged at positions corresponding to the hollow connection member of the coupling part in the vertical direction.

The fiber distribution housing may further include a top cover having an inclined surface provided on the upper surface of the housing.

The height of the top cover may be increased and then decreased.

The fiber distribution housing may further include a reinforcing member provided within the top cover.

The reinforcing member may be arranged in a direction vertical to the varying direction of the height of the top cover.

In accordance with another aspect of the present invention, there is provided a fiber distribution housing including a housing having an opened front surface, at least one splitter module mounted on the housing for splitting feeding cables, a connecting part having a plurality of connection adapters formed on the front and rear surfaces thereof, and a coupling part for mounting the connecting part on the housing for enabling the connecting part to be displaceable.

The at least one splitter module may be mounted on one of the inner wall surfaces of the housing.

The at least one splitter module may be mounted on a mounter installed on the ceiling from among the inner wall surfaces of the housing.

The mounter may include cable holders to fix feeding cables connected to the at least one splitter module or split cables split by the at least one splitter module.

The connecting part may be mounted on the housing through the coupling part such that the connecting part is displaceable between a predetermined first position and second position.

The coupling part may include a hollow connection member through which the split cables split by the at least one splitter module pass.

The connecting part may include a connecting panel having the plurality of connection adapters on the front and rear surface thereof, and a connecting cabinet which has opened front and rear surfaces and on which the connecting panel is mounted, an installation space in which the connecting panel is installed may be provided at the upper portion of the connecting cabinet, and a receiving space in which splice trays are received may be provided at the lower portion of the connecting cabinet.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
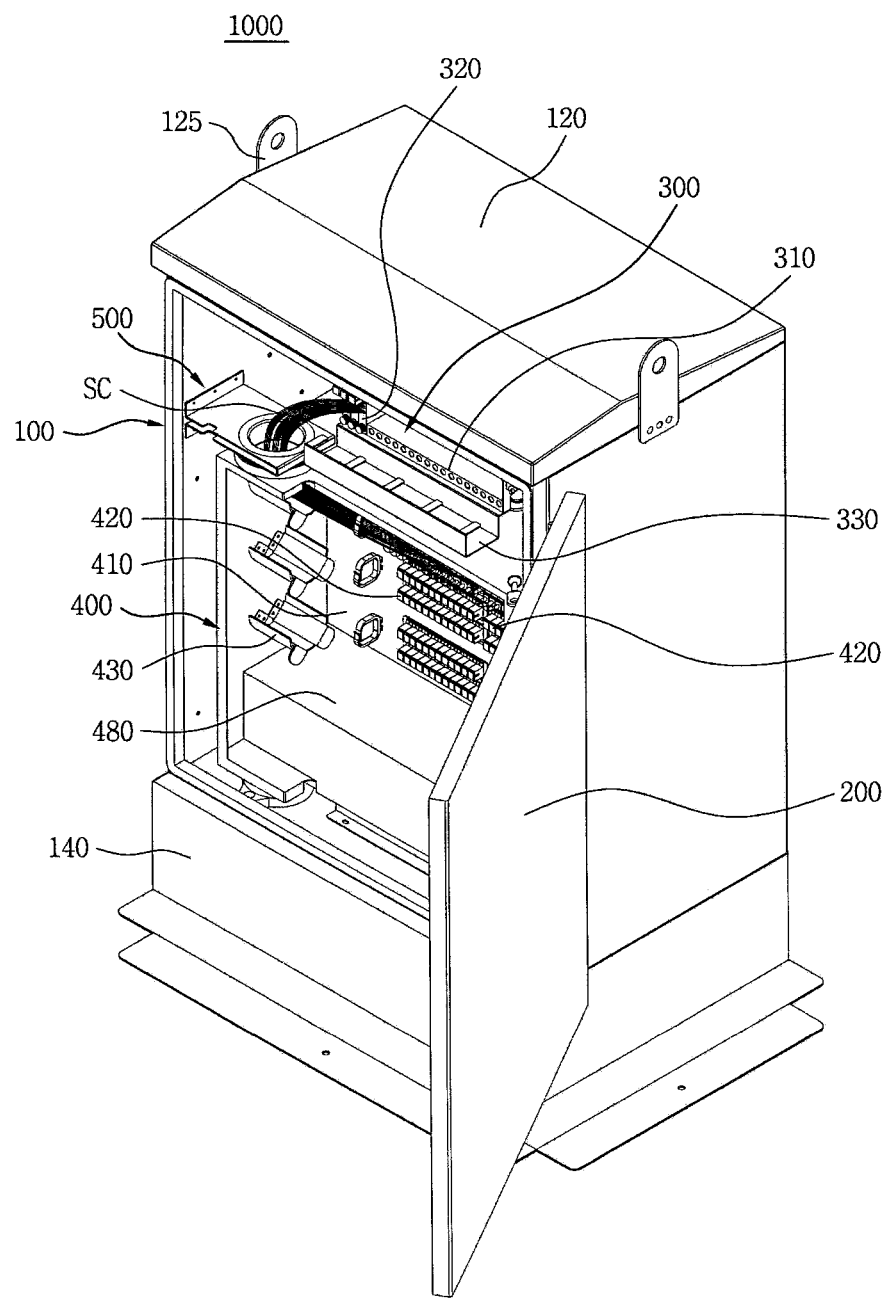
FIG. 1 is a perspective view of a fiber distribution housing in accordance with the present invention in a state in which a front door is opened.
Figure 2:
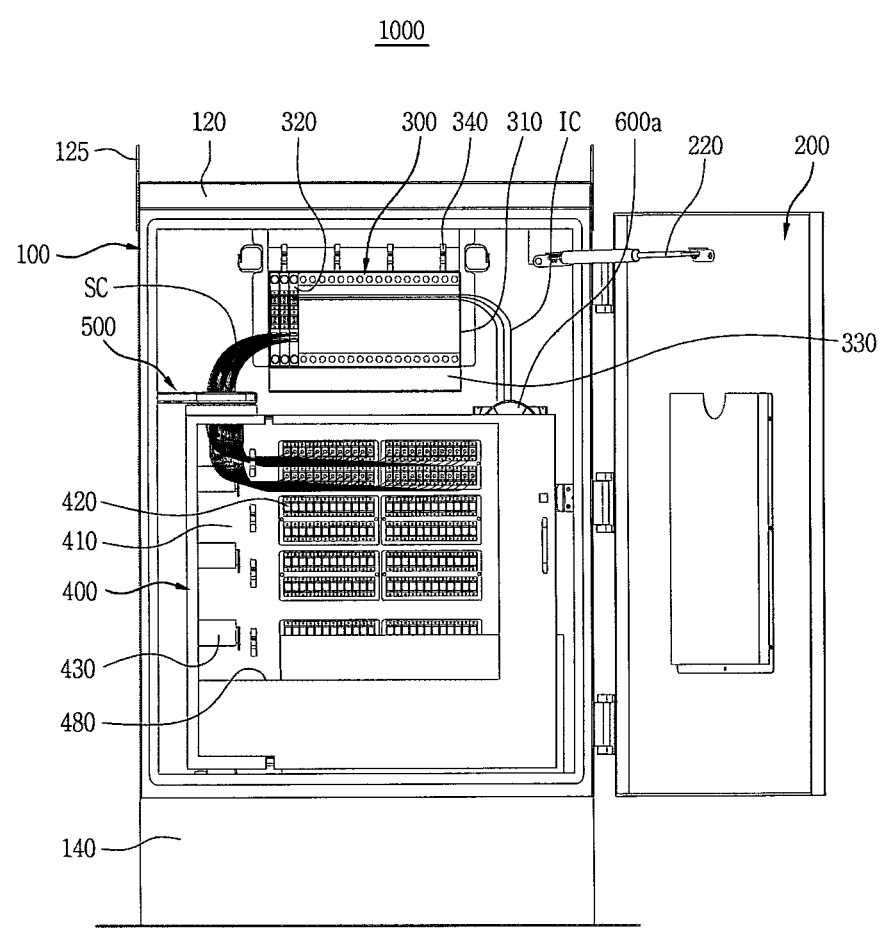
FIG. 2 is a front view of the fiber distribution housing in accordance with the present invention in the state in which the front door is opened.
Figure 3:
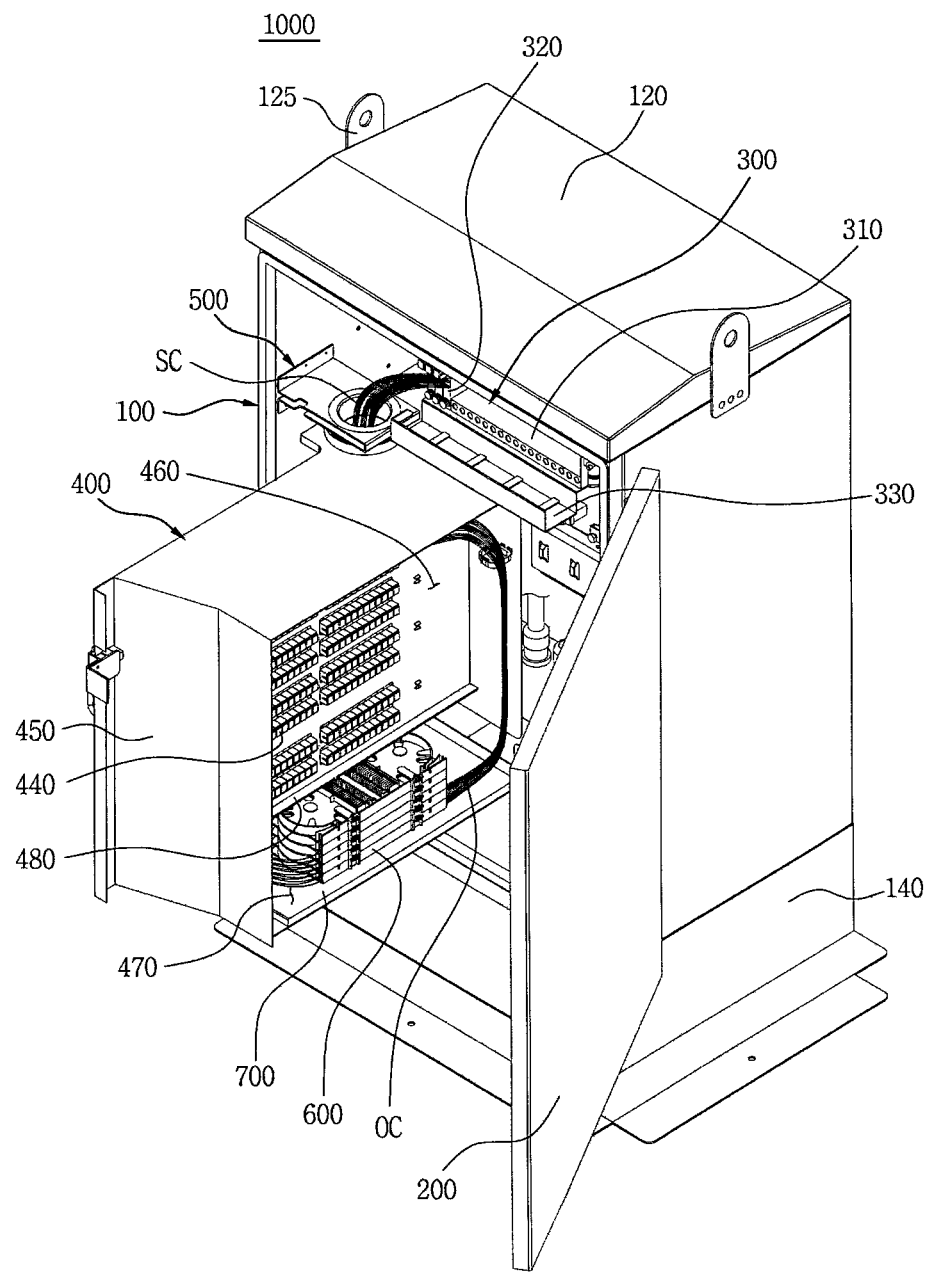
FIG. 3 is a perspective view of the fiber distribution housing in accordance with the present invention in a state in which a connecting part is unfolded.

Hereinafter, preferred embodiments of the present invention will be described with reference to the annexed drawings. However, the present invention is not limited to the embodiments described herein and may be variously modified. The embodiments described herein are provided to allow those skilled in the art to thoroughly and completely understand disclosed contents, and to sufficiently convey the scope of the present invention to those skilled in the art. In the drawings, the same or similar elements are denoted by the same reference numerals even though they are depicted in different drawings FIG. 1 is a perspective view of a fiber distribution housing 1000 in accordance with the present invention in a state in which a front door 200 is opened, FIG. 2 is a front view of the fiber distribution housing 1000 in accordance with the present invention in the state in which the front door 200 is opened, and FIG. 3 is a perspective view of the fiber distribution housing 1000 in accordance with the present invention in a state in which a connecting part 400 is unfolded.

The fiber distribution housing 1000 in accordance with the present invention includes a housing 100 having an accommodation space, the front door 200 selectively closing the accommodation space, a splitting part 300 for splitting feeding cables entering from the outside, the connecting part 400 including a plurality of connection adapters 420 and 440 on the front surface and the rear surface of the connecting part 400 and mounted on the housing 100 so as to be displaced to a first position and a second position, and a coupling part 500 which mounts the connecting part 400 on the housing 100 and through which the split cables SC split by the splitting part 300 pass to be arranged in the direction of the connection adapters 420 and 440 of the connecting part 400.

The fiber distribution housing 1000 in accordance with the present invention includes the cabinet-shaped housing 100 providing with the accommodation space formed therein. The accommodation space within the housing 100 accommodates the connecting part 400 which will be described later. The front door 200 to selectively close the accommodation space of the housing 100 is connected to the housing 100 by a hinge (not shown). Further, a damper 220 may be provided between the front door 200 and the housing 100.

The housing 100 may be mounted on the upper surface of a mounting member 140 having a connection space to be mounted in a designated place.

The mounting member 140 may be formed integrally with the housing 100, or may be formed separately from the housing 100 and be then coupled with the housing 100.

The splitting part 300 for splitting the feeding cables IC supplied from the outside may be provided on the housing 10. The splitting part 300 may be mounted within the housing 100, and include at least one splitter module 320 and a mounter 310 on which the at least one splitter module 320 is mounted in parallel. The mounter 310 may be fixed to the inner wall surface of the housing 100.

If the splitter module 320 is mounted on the upper surface of the connecting part 400 of the fiber distribution housing 1000, the overall weight of the connecting part 400 is increased and thus applies physical load to the coupling part 500 to couple the connecting part 400 with the housing 100 and influences durability of the coupling part 500. Therefore, the fiber distribution housing 1000 in accordance with the present invention employs a method of fixing the splitter module 320 to the housing 100, thereby being capable of reducing the weight of the connecting part 400 configured for enabling an unfolding operation.

If the splitter module 320 is fixed to the inner wall surface of the housing 100 other than the connecting part 400 enabling the unfolding operation, tension or stress applied to the feeding cables inserted into the splitting part 300 according to unfolding of a connecting panel 410 of the fiber distribution housing 1000 may be minimized, and thus generation of communication errors in all optical communication consumers due to tension or stress applied to the feeding cables inserted into the splitting part 300 according to unfolding of the connecting panel 410 of the fiber distribution housing 1000 may be prevented.

That is, tension or stress applied to a specific split cable may cause a communication error in only a specific optical communication consumer, but damage to the feeding cables may cause communication errors in all optical communication consumers. Therefore, a method of fixing the position of the splitter module 320 is employed.

In the embodiment shown in FIGS. 1 to 3, the mounter 310 may be fixed to the ceiling from among the inner wall surfaces of the housing 100. That is, the mounter 310 is fixed to the ceiling of the housing 100, and plural splitter modules 320 are mounted in parallel on the mounter 310.

The number of the splitter modules 320 mounted on the mounter 310 may be varied. That is, the number of the splitter modules 320 may be increased or decreased according to the feeding cables or optical communication demand.

The respective splitter modules 320 split the feeding cables IC of optical cables supplied from the outside into plural split cables SC.

The split cables SC split by the splitter modules 320 are mounted on the connection adapters 420 of the connecting part 400 provided within the housing 10.

In the embodiment shown in FIG. 1, the connecting part 400 is provided below the splitting part 300. The connecting part 400 of the fiber distribution housing 1000 in accordance with the present invention may be configured to be unfolded and displaced from the housing 100 for the purpose of worker's operating convenience.

That is, the connecting part 400 is stored within the accommodation space of the housing 100 during non-operation, and is unfolded to be exposed to the outside of the accommodation space of the housing 100 only when a worker executes a cable connecting operation.

The connecting part 400 includes the connecting panel 410 having the connection adapters 420 and 440 on the front and rear surfaces thereof, and a connecting cabinet 450 (with reference to FIG. 3) having opened front and rear surfaces on which the connecting panel 410 is mounted.

The connecting cabinet 450 provides a mounting space on which the connecting panel 410 is stably mounted, and provides a coupling space to be coupled with the coupling part 500 provided for mounting the connecting part 400 on the housing 100 so as to be unfoldable or displaceable.

The coupling part 500 serves for mounting the connecting panel 410 on the housing 100 so as to be displaceable, thereby coupling the connecting part 400 with the housing 100 such that the connecting part 400 may be displaced or unfolded to a first position (an accommodation position) and a second position (a unfolding position).

As shown in FIG. 3, the fiber distribution housing 1000 in accordance with the present invention unfolds the connecting part 400 from the accommodation space within the housing 100 if a worker executes the cable connecting operation, etc., thereby exposing the connection adapters 440 provided on the rear surface of the connecting panel 410 of the connecting part 400 to the worker.

Therefore, the worker may execute an operation of mounting or separating cables on or from the connection adapters 420 on the front surface of the connecting panel 410 of the connecting part 400 under the condition that the connecting part 400 is accommodated in the accommodation space of the housing 100 and only the front door 200 is opened, as shown in FIG. 1, as needed, and may unfold the connecting part 400 from the accommodation space to expose the rear surface of the connecting panel 410 to the worker to improve workability of the cable connecting operation, as shown in FIG. 3.

The connecting panel 410 has the connection adapters 420 and 440 respectively on the front and rear surfaces thereof, the split cables SC distributed by the splitting part 300 are mounted on the front surface of the connecting panel 410, and connection cable OC respectively connecting the split cables SC to splice trays optical connection trays), which will be described later, are mounted on the rear surface of the connecting panel 410.

A receiving space 470 for the splice trays 600 may be provided at the lower portion of the connecting cabinet 450 of the connecting part 400 shown in FIG. 3.

That is, the upper space of the connecting cabinet 450 is used as an installation space 460 in which the connecting panel 410 is installed, and the lower surface of the connecting cabinet 450 is used as the receiving space 470 for the splice trays 600.

Therefore, since an operating space during an optical connecting operation may be secured by the worker through the splice trays 600 by separating the receiving space 470 from the mounting place of the connecting panel 410, workability may be improved.

The connecting part 400 may include a partition member 480 to divide the installation space 460 of the connecting panel 410 and the receiving space 470 of the splice trays 600 from each other.

The partition member 480 may be horizontally provided at the lower end of the connecting panel 410.

The partition member 480 may be formed integrally with the connecting panel 410, or may be formed separately from the connecting panel 410.

The connecting panel 410 is vertically installed at the center of the connecting cabinet 450 having a pipe shape having opened front and rear surfaces, and the partition member 480 is horizontally installed at the lower end portion of the connecting cabinet 450.

Plural spools 430 on which the split cables SC are wound may be provided on the inner side surface of the connecting cabinet 450. The spools 430 may be arranged at positions corresponding to a hollow connection member 510 (with reference to FIG. 4) of the coupling part 500 in the vertical direction. Therefore, the split cables SC passing through the hollow connection member 510 may be wound on the spools 430, as needed, and thus cable arrangement in the connecting part 400 may be simplified.

The plural splice trays 600 may be horizontally stacked.

Further, splice trays 600a (with reference to FIGS. 2 and 6) to splice the feeding cables may be fixed to the inner wall surface of the housing 100.

The splitting part 300 and the splice trays 600a to splice and split the feeding cables are fixed to the inner wall surface of the housing 100, and the splice trays 600 to splice the connection cables connected to the split cables are provided in the receiving space 470 at the lower portion of the connecting part 400. Further, the splice trays 600 and 600a may be substituted with direct connection type optical connectors.

Of course, the partition member 480 may be formed in a flat plate type, or be formed in an L-shaped type, as shown in FIGS. 1 to 3.

Since the partition member 480 may be formed in the L-shaped type, the splice tray 600 provided in the receiving space 470 of the connecting part 400 may not be exposed to the front region by a vertical portion of the partition member 480, as shown in FIGS. 1 and 2, if the connecting part 400 is accommodated in the accommodation space of the housing 100.

As shown in FIGS. 1 to 3, the connecting part 400 may be accommodated in the accommodation space of the housing 100 or be unfolded to the outside of the accommodation space, as needed during the cable connecting operation. The fiber distribution housing 1000 in accordance with the present invention includes the coupling part 500 for mounting the connecting part 400 on the housing 100 such that the connecting part 400 is unfoldable.

The coupling part 500 is provided to couple the connecting part 400 with the housing 100 such that the connecting part 400 may be displaced or unfolded to the first position (the accommodation position, with reference to FIGS. 1 and 2) and the second position (the unfolding position, with reference to FIG. 3).

The coupling part 500 serves to mount the connecting part 400 on the housing 100 so as to be displaceable and functions as a cable holder through which the split cables SC split by the splitting part 300 pass so as to be arranged in the direction of the connection adaptors 420 and 440 of the connecting panel 410.

The reason why the split cables SC split by the splitting part 300 pass through the inside of the coupling part 500 is to minimize tension or stress applied to the split cables SC during a unfolding or displacement operation of the connecting part 400, if the connecting part 400 is unfolded from the first position to the second position by the coupling part 500.

The splitter modules 320 of the splitting part 300 of the fiber distribution housing 1000 in accordance with the present invention are fixed to a predetermined position at the inside of the fiber distribution housing 1000 in order to minimize tension or stress applied to the feeding cables IC (with reference to FIG. 2), etc.

Therefore, due to the unfolding or displacement operation during the unfolding or displacement process of the connecting part 400, an arrangement path of the split cables SC split by the fixed splitter modules 320 may interfere with the connecting part 400 and a distance between the splitting part 300 and the connection adapters 420 and 440 of the connecting panel 410 may be varied, and thus variable tension or stress may be applied to the split cables SC connecting the splitting part 300 and the connecting panel 410.

Accordingly, in order to minimize deviation of the distance between the splitter modules 320 located at the fixed position regardless of unfolding or displacement of the connecting part 400 and the connection adapters 420 and 440 of the connecting panel 410, the fiber distribution housing 1000 in accordance with the present invention may use the coupling part 500 to couple the connecting part 400 with the housing 100 as the arrangement path of the split cables SC.

Hereinafter, a detailed description of the coupling part 500 will be given with reference to FIG. 4.

Figure 4:
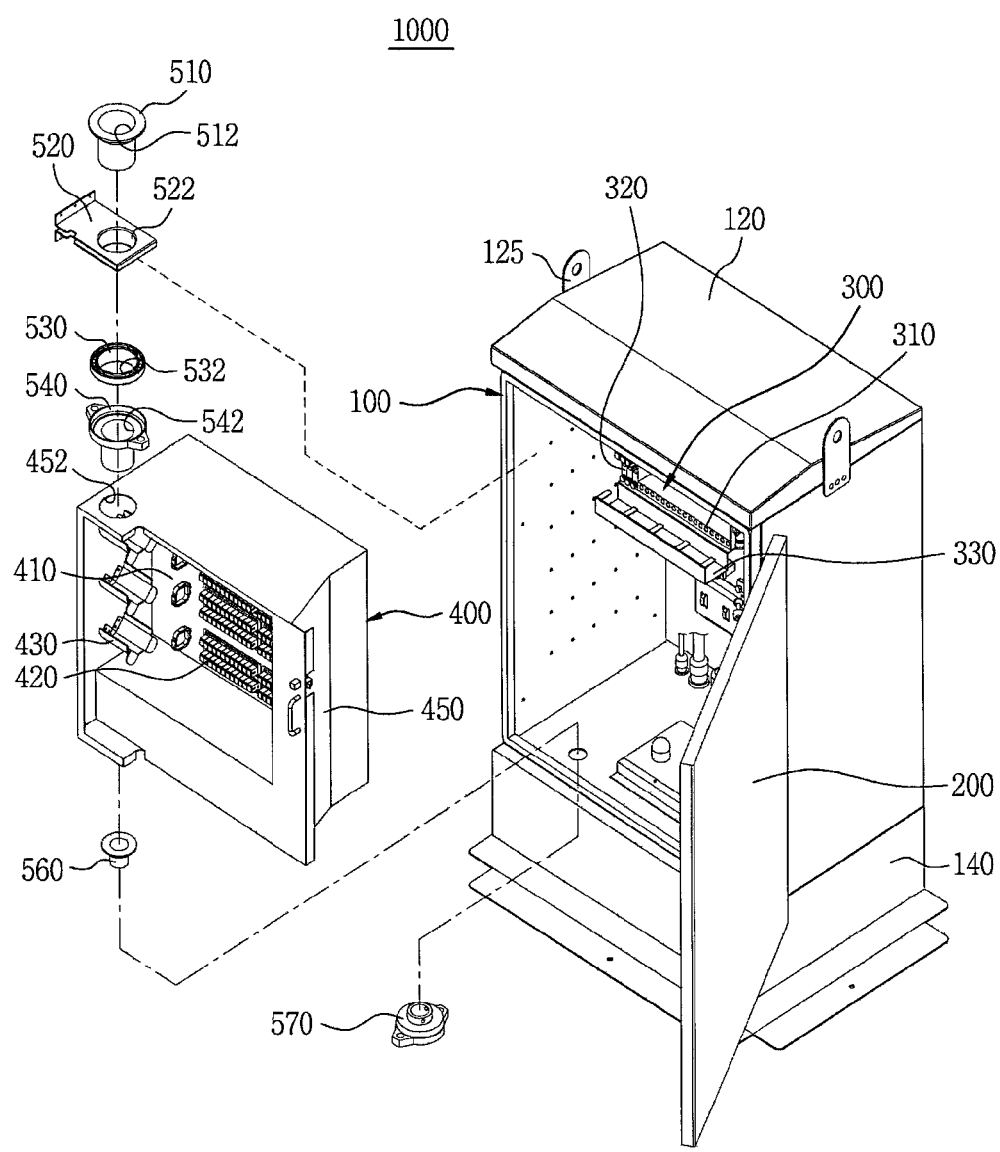
FIG. 4 is a perspective view of the fiber distribution housing of FIG. 2 in a state in which the connecting part and a coupling part are separated from each other.

FIG. 4 is a perspective view of the fiber distribution housing 1000 of FIG. 3 in a state in which the connecting part 400 and the coupling part 500 are separated from each other.

As shown in FIGS. 1 to 3, the coupling part 500 may be located at a lower position than the splitting part 300, i.e., below the splitting part 300. The reason for this is to arrange the split cables SC on the arrangement path from the splitting part 300 to the connecting part 400.

As shown in FIG. 4, the coupling part 500 may include a fixing member 520 fastened to the inner wall surface of the housing 100, the hollow connection member 510 passing through the fixing member 520, and a bearing member 530 supporting the outer circumferential surface of the hollow connection member 510.

The coupling part 500 of the fiber distribution housing 1000 in accordance with the present invention may further include a bracket member 540 which is mounted on the connecting part 400 and on which the bearing member 530 is seated.

The bracket member 540 is coupled with the connecting cabinet 450 of the connecting part 400, and accommodates the bearing member 530 under the condition that the bearing member 530 is seated on the bracket member 540, and the outer circumferential surface of the hollow connection member 510 is supported by an inner surface 532 of the bearing member 530.

Therefore, the connecting cabinet 450 of the connecting part 400 may be smoothly unfolded while minimizing friction with the hollow connection member 510 mounted on the fixing member 520 by the bearing member 530 during the unfolding operation, and a hollow 512 of the hollow connection member 510 may be used as the arrangement path of the split cables.

As shown in FIGS. 1 to 4, the split cables SC split by the splitter modules 320 may be arranged on the connection adaptors 420 of the connecting panel 410 of the connecting part 400 through the hollow 512 of the hollow connection member 510. Further, since the hollow connection member 510 may be supported by the bearing member 530, the connecting part 400 may be smoothly unfolded, as needed.

Consequently, the coupling part 500 serves to mount the connecting part 400 on the housing 400 so as to enable the connecting part 400 to be unfolded from the housing 100 and is used to the arrangement path of the split cables SC split by the splitter module 320 provided at a fixed position within the housing 100, thereby minimizing tension or stress applied to the split cables SC and facilitating arrangement of the cables within the fiber distribution housing 1000, simultaneously.

The coupling part 500 may further include a support member 560 to support the lower portion of the connection cabinet 450 while minimizing friction with the lower surface of the housing 100, and a coupling member 570 to fix the support member 560.

Plural bearings 100b (with reference to FIG. 6) to support the unfolding operation of the connecting cabinet 450 may be provided on the bottom surface of the housing 100.

The configuration of the coupling part 500 shown in FIG. 4 is one example of a configuration to support the connecting part 400 so as to enable the connecting part 400 to be unfolded. The coupling part 500 may have any configuration as long as the coupling part 500 is configured such that the split cables may pass through the coupling part 500 and the coupling part 500 may rotatably support the connecting part 400.

Figure 5:
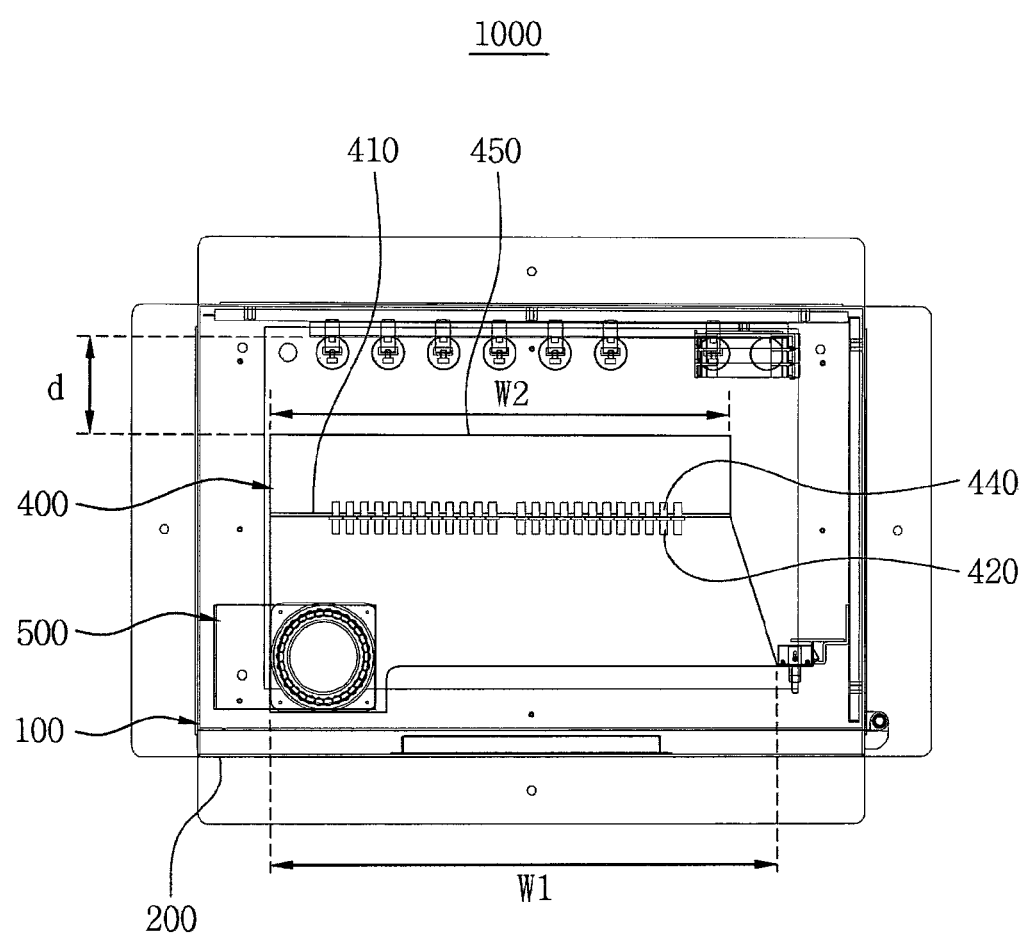
FIG. 5 is a transversal-sectional view of the fiber distribution housing in accordance with the present invention, as seen from the top.
Figure 6:
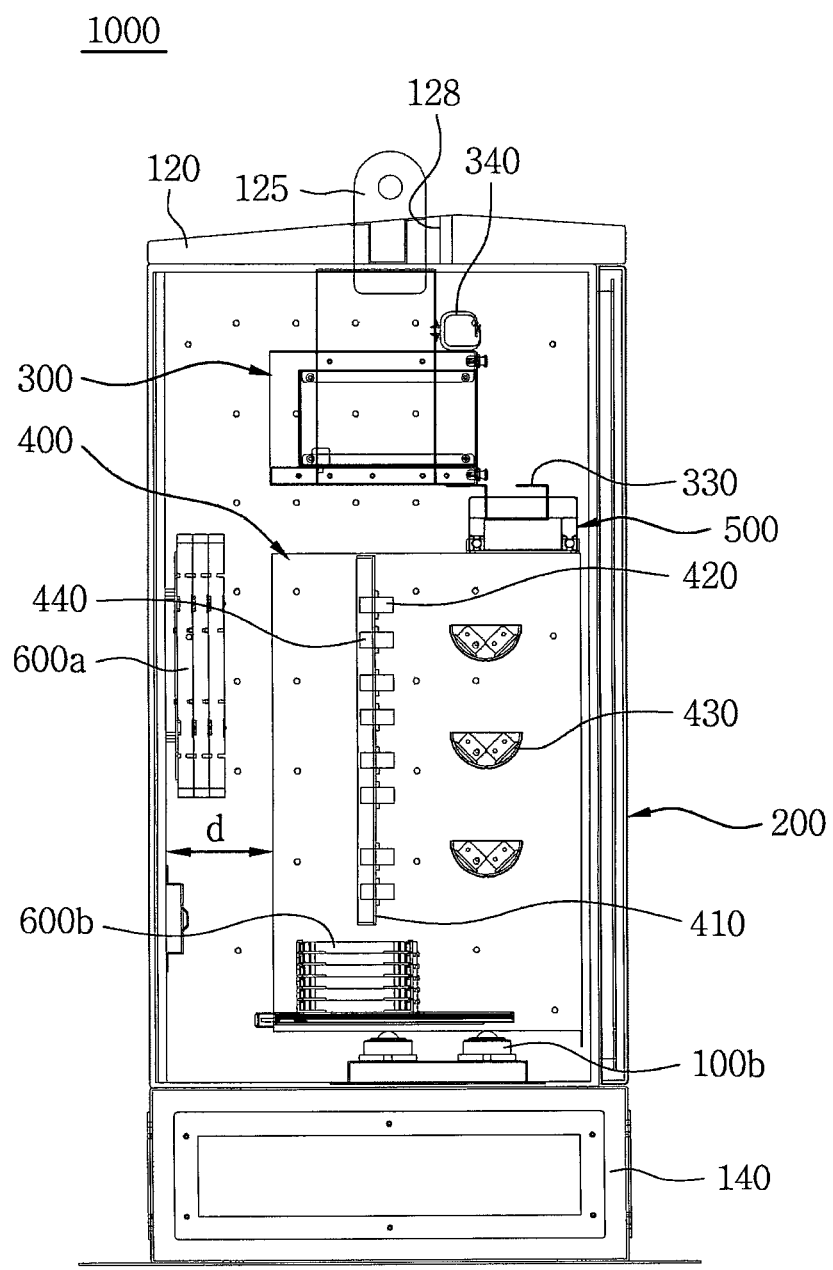
FIG. 6 is a longitudinal-sectional view of the fiber distribution housing in accordance with the present invention, as seen from the side.

FIG. 5 is a transversal-sectional view of the fiber distribution housing 1000 in accordance with the present invention, as seen from the top, and FIG. 6 is a longitudinal-sectional view of the fiber distribution housing 1000 in accordance with the present invention, as seen from the side.

The fiber distribution housing 1000 in accordance with the present invention includes the connecting part 400 which is unfolded from the accommodation space of the housing 100, and the connecting part 400 includes the connecting panel 410 having the connection adaptors on the front and rear surfaces thereof, and the connecting cabinet 450 on which the connecting panel 410 is mounted.

The connecting part 400 may be accommodated within the accommodation space of the housing 100 of the fiber distribution housing 1000, or be unfolded to the outside of the housing 100.

The connecting part 400 has the plural connection connectors 420 and 440 on the front and rear surfaces thereof, and the split cables SC and the connection cables OC are respectively connected to the connection connectors 420 and 440. Therefore, a connection state of the cables may be released by impact applied from the outside.

Particularly, since the fiber distribution housing 1000 may be installed in public places, impact may be applied to the housing 100 of the fiber distribution housing 1000.

If the housing 100 of the fiber distribution housing 1000 does not absorb or block impact applied from the outside and is damaged, when the damaged housing 100 directly hits the connecting part 400 of the fiber distribution housing 1000, optical communication errors of respective consumers connected to the connecting adaptors of the connecting part 400 may be generated.

Therefore, even if the housing 100 of the fiber distribution housing 1000 is damaged and broken to some degree, consideration in design to prevent damage to the connecting part 400 is necessary.

The connecting panel 410 of the connecting part 400 may be deeply installed within the connecting cabinet 450.

Therefore, there is a slight possibility that impact is transmitted to the connecting part 400 by the front door 200 damaged by impact applied from the outside.

However, impact applied to the rear surface of the housing 100 under the condition that the connecting part 400 is accommodated in the accommodation space of the housing 100 may damage the rear surface of the housing 100, and there is a possibility that the damaged rear surface of the housing 100 hits or damages the connecting part 400.

Therefore, the fiber distribution housing 1000 in accordance with the present invention is designed such that a separation distance D between the rear surface of the housing 100 of the fiber distribution housing 1000 and the connecting part 400 accommodated within the housing 100 is experimentally more than 30 mm.

Table 1 below states thicknesses of the housing 100 of the fiber distribution housing 1000 formed of metal, and amounts of deformation of the rear surface of the housing 100 when external impact is applied to the housing 100.

If sufficient impact having a predetermined intensity which may damage the housing 100 is applied to the housing 100, an amount of deformation of the rear surface of the housing 100 is inversely proportional to the thickness of the housing 100. Therefore, when the thickness of the housing 100 is sufficiently large, the separation distance D may be minimized.

However, in consideration of the production cost or weight of a product, it is difficult to use the housing 100 having a thickness more than about 3.5 mm.

If the thickness of the housing 100 of the fiber distribution housing 1000 is set to 3.5 mm which is substantially the maximum thickness, it is observed that a deformation distance of the rear surface of the housing 100 is about 30 mm. Therefore, the fiber distribution housing 1000 in accordance with the present invention is preferably designed such that the separation distance D between the connecting part 400 and the rear surface of the housing 100 of the fiber distribution housing 1000 is more than 30 mm.

Further, if stiffness of the fiber distribution housing 1000 which is at the least required is considered, the minimum thickness of the housing 100 is required and excessive increase of the overall thickness of the fiber distribution housing 1000 is not preferable, and thus the fiber distribution housing 1000 is designed such that the separation distance D does not exceed 100 mm.

TABLE 1

| Thickness of rear surface of housing (mm) | Amount of deformation of rear surface of housing (mm) |
| --- | --- |
| 2 | 45 |
| 3 | 35 |
| 3.5 | 30 |

Further, the width w1 of the front portion of the connecting cabinet 450 of the connecting part 400 may be greater than the width w2 of the rear portion of the connecting cabinet 450.

Since the coupling part 500 coupled with the housing 100 so as to enable the connecting part 400 to be unfolded is coupled with the front region of the left portion of the connecting part 400, the rear corner of the connecting part 400 does not interfere with the inner surface of the housing 100 when the connecting part 400 is unfolded.

Further, as shown in FIG. 6, a top cover 120 including an inclined surface may be provided on the upper surface of the housing 100. The top cover 120 is easily exposed to rainwater. Thus, the top cover 120 may be formed of a material differing from the housing 100 of the fiber distribution housing 1000 in order to improve corrosion resistance, and have a designated inclination.

The fiber distribution housing 1000 in accordance with the present invention may be installed outdoors, and have an inclined surface so as to prevent rainwater from being collected or retained on the upper surface of the housing 100. The inclined surface may be varied. As shown in FIG. 6, as a method of varying the inclined surface, the height of the top cover 120 may be increased and then decreased. Such a top cover 120 may have an inclination of 5 to 30 degrees.

As the top cover 120 is formed of a material differing from the housing 100 and has the inclined surface, as shown in FIG. 6, a surplus space may be formed in the top cover 120, and a reinforcing member 128 may be further provided in the surplus space.

The reinforcing member 128 may be arranged in a direction vertical to the varying direction of the height of the top cover 120, as shown in FIG. 6. Further, a conveyance loop 125 facilitating conveyance of the fiber distribution housing 100 when the fiber distribution housing 100 is installed may be provided on the housing 100 or the top cover 120.

The splitting part 300 of the fiber distribution housing 1000 in accordance with the present invention may be mounted on the mounter 310 installed on the ceiling from among the inner wall surfaces of the housing 100, and the mounter 310 may include cable holders 330 and 340 to fix the feeding cables connected to the splitting part 300 or the split cables SC split by the splitting part 300.

The cable holders 330 and 340 may include a housing holder 330 and a ring holder 340 in which a bundle of cables is held.

That is, the cable holders 330 and 340 may selectively hold the split cables SC (with reference to FIG. 2) split by the splitting part 300 or the cables IC (feeding cables, with reference to FIG. 2) which will be split.

Positions to which the feeding cables IC which will be split and the split cables SC are connected may be formed on the same surface or opposite surfaces of the splitter module 320 of the splitting part 300. Even if the positions to which the feeding cables IC which will be split and the split cables SC are connected are formed on the same surface the splitter module 320 of the splitting part 300, the splitter module 320 may separately hold the feeding cables IC which will be split and the split cables SC.

Further, the fiber distribution housing 100 in accordance with the present invention may include splice trays to respectively splice the feeding cables and the split cables.

The splice trays 600a to splice the feeding cables may be fixed to the wall surface of the housing 100, and the splice trays 600b to splice the splits cables or the connection tables may be provided on the connecting part 400.

Therefore, the splice trays 600b to splice the split cables or the connection cables may be unfolded together with the connecting part 400 during the unfolding operation of the connecting part 400.

Figure 7:
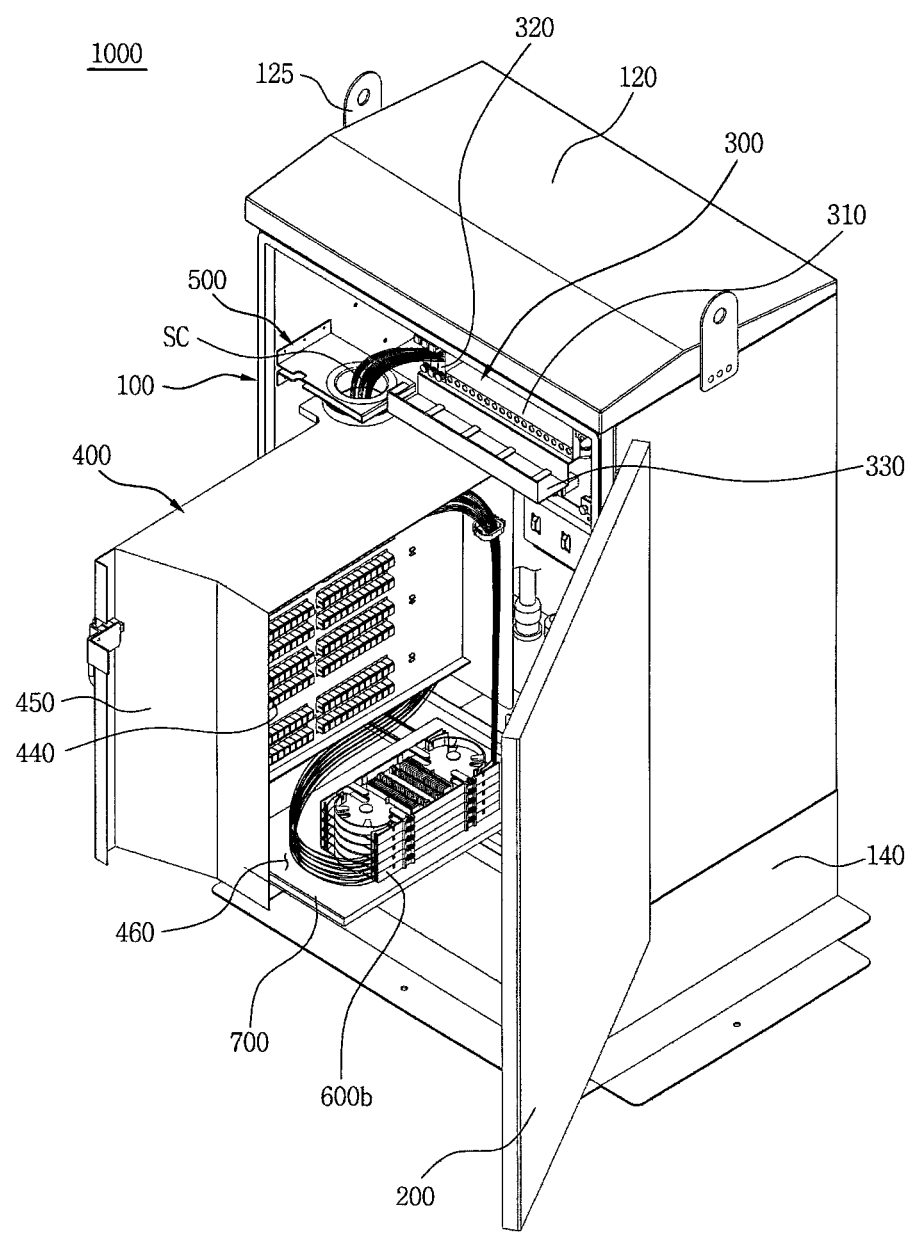
FIG. 7 is a perspective view of the fiber distribution housing in accordance with the present invention in a state in which splice trays are taken out of the fiber distribution housing.

FIG. 7 is a perspective view of the fiber distribution housing 1000 in accordance with the present invention in a state in which the splice trays 600b mounted on the connecting part 400 are taken out of the fiber distribution housing 1000.

Further, as described above, the upper space of the connecting cabinet 450 may be used as the installation space of the connecting panel 410 in which the connecting panel 410 is installed, and the lower space of the connecting cabinet 450 may be used as the receiving space for the splice trays 600b.

A lower surface member 700 of the receiving space in which the splice trays 600b is received is configured to be slidable, and may thus improve workability of the optical connection operation, if connection of the splice trays 600b is executed.

The lower surface member 700 of the receiving space is selectively taken out using guide rails (not shown) provided on the lower surface thereof, thereby enabling the cable connection operation to be executed.

As apparent from the above description, in a fiber distribution housing in accordance with the present invention, a splitting part mounted in a housing of the fiber distribution housing is fixed to the inside of the housing, thereby being capable of minimizing tension or stress applied to feeding cables entering the splitting part according to unfolding of a connecting panel of the fiber distribution housing.

Further, simultaneous generation of communication errors in all optical communication consumers due to tension or stress applied to the feeding cables entering the splitting part according to unfolding of the connecting panel of the fiber distribution housing may be prevented.

Further, split cables split by a splitting part are arranged through a coupling part to couple the connecting panel of the fiber distribution housing with the housing of the fiber distribution housing, thus minimizing interference of the split cables with the rotated or displaced connecting panel.

Further, the cables split by the splitting part are arranged through the coupling part to couple the connecting panel of the fiber distribution housing with the housing of the fiber distribution housing, thereby facilitating arrangement of the split cables around the connecting panel and thus improving worker's operation efficiency.

Moreover, the fiber distribution housing in accordance with the present invention employs a method of fixing splitter modules to the housing, thereby being capable of reducing the weight of the connecting part configured to be unfolded.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber distribution housing comprising:
a housing having an accommodation space;
a splitting part for splitting feeding cables entering the housing;
a connecting part having a plurality of connection adapters formed on the front and rear surfaces thereof, and mounted on the housing to be displaced to a first position and a second position; and
a coupling part which rotatably supports the connecting part on the housing,
wherein the splitting part is mounted on a mounter fixed on a ceiling of the housing from among inner wall surfaces of the housing, the coupling part is provided below the splitting part, and the connecting part is provided below the coupling part,
wherein the coupling part includes a fixing member fastened to one surface of the inner wall surfaces of the housing, a hollow connection member passing through the fixing member, and a bearing member supporting an outer circumferential surface of the hollow connection member, and
wherein feeding cables are inserted into the splitting part mounted on the mounter, wherein split cables split by the splitting part are arranged in a direction of the connection adapters, pass through the hollow connection member, and are connected to the plurality of connection adapters of the connecting part.

2. The fiber distribution housing according to claim 1, wherein the coupling part further includes a bracket member which is mounted on the connecting part and on which the bearing member is seated.

3. The fiber distribution housing according to claim 1, wherein the fixing member is horizontally mounted on an inner side wall surface from among the inner wall surfaces of the housing.

4. The fiber distribution housing according to claim 1, wherein the connecting part includes a connecting panel having the plurality of connection adapters on front and rear surfaces thereof, and a connecting cabinet which has opened front and rear surfaces and on which the connecting panel is mounted, and the connecting cabinet is coupled with the housing by the coupling part.

5. The fiber distribution housing according to claim 4, wherein a separation distance between the connecting part at the first position, where the connecting part is accommodated in the housing, and the rear surface of the housing is 30 mm to 100 mm.

6. The fiber distribution housing according to claim 4, wherein a plurality of spools on which the split cables are wound is provided on the inner side wall surface of the connecting cabinet, and is arranged at positions corresponding to the hollow connection member of the coupling part in the vertical direction.

7. The fiber distribution housing according to claim 1, further comprising a top cover having an inclined surface provided on the upper surface of the housing.

8. The fiber distribution housing according to claim 7, wherein the height of the top cover is increased and then decreased such that a top height line of the top cover is positioned near a front opening of the housing and the top cover has an asymmetric side view.

9. The fiber distribution housing according to claim 7, further comprising a reinforcing member provided within the top cover.

10. The fiber distribution housing according to claim 9, wherein the reinforcing member is arranged in a direction vertical to the varying direction of the height of the top cover.

11. A fiber distribution housing comprising:
a housing having an opened front surface;
at least one splitter module mounted on a mounter fixed on an inner wall surface of the housing for splitting feeding cables;
a connecting part having a plurality of connection adapters formed on the front and rear surfaces thereof; and
a coupling part which rotatably supports the connecting part on the housing to enable the connecting part to be rotated, wherein the coupling part is provided below the splitter module and the connecting part is provided below the coupling part, wherein feeding cables are inserted into the splitter module, wherein split cables split by the splitter module are arranged in a direction of the connection adapters, pass through the coupling part, and are connected to the plurality of connection adapters of the connecting part, wherein the connecting part includes a connecting panel having the plurality of connection adapters on front and rear surfaces thereof, and a connecting cabinet having opened front and rear surfaces and on which the connecting panel is mounted, wherein a width of a front portion of the connecting cabinet of the connecting part is greater than a width of a rear portion of the connecting cabinet.

12. The fiber distribution housing according to claim 11, wherein the mounter is fixed on a ceiling of the housing.

13. The fiber distribution housing according to claim 12, wherein the mounter includes cable holders to fix feeding cables connected to the at least one splitter module or split cables split by the at least one splitter module.

14. The fiber distribution housing according to claim 11, wherein the connecting part is mounted on the housing through the coupling part such that the connecting part is displaceable between a predetermined first position and second position.

15. The fiber distribution housing according to claim 14, wherein the coupling part includes a hollow connection member through which the split cables split by the at least one splitter module pass.

16. The fiber distribution housing according to claim 13, installation space in which the connecting panel is installed is provided at an upper portion of the connecting cabinet, and a receiving space in which splice trays are received is provided at a lower portion of the connecting cabinet.

* * * * *